United States Patent
Dinerstein et al.

(10) Patent No.: US 8,325,993 B2
(45) Date of Patent: Dec. 4, 2012

(54) STANDOFF AND MOBILE FINGERPRINT COLLECTION

(75) Inventors: Jonathan Dinerstein, Draper, UT (US);
Sabra Dinerstein, Draper, UT (US);
Eric D. Eborn, Midvale, UT (US)

(73) Assignee: Lockheed Martin Corporation, Bethesda, MD (US)

( * ) Notice: Subject to any disclaimer, the term of this patent is extended or adjusted under 35 U.S.C. 154(b) by 386 days.

(21) Appl. No.: 12/645,813

(22) Filed: Dec. 23, 2009

(65) Prior Publication Data

US 2011/0150303 A1      Jun. 23, 2011

(51) Int. Cl.
*G06K 9/00* (2006.01)
(52) U.S. Cl. .......................... 382/115; 382/124; 382/125
(58) Field of Classification Search .................. 382/115, 382/124, 125, 126, 127; 118/31.5; 283/68, 283/69, 70, 78; 340/5.53, 5.83; 396/15; 713/186
See application file for complete search history.

(56) References Cited

U.S. PATENT DOCUMENTS

| | | | |
|---|---|---|---|
| 4,236,082 A | 11/1980 | Butler | |
| 4,936,680 A | 6/1990 | Henkes et al. | |
| 6,898,301 B2 | 5/2005 | Iwanaga | |
| 7,280,676 B2 | 10/2007 | Miura et al. | |
| 2007/0223792 A1 | 9/2007 | Morimoto et al. | |
| 2007/0230754 A1 | 10/2007 | Jain et al. | |
| 2008/0080751 A1 | 4/2008 | Bee et al. | |
| 2008/0101664 A1 | 5/2008 | Perez | |
| 2009/0080709 A1 | 3/2009 | Rowe et al. | |

FOREIGN PATENT DOCUMENTS

| | | |
|---|---|---|
| JP | 2001326841 A | 11/2001 |
| JP | 2004126782 A | 4/2004 |

OTHER PUBLICATIONS

Sharat et al. "Fingerprint Enhancement using STFT analysis" The Journal of the Pattern Recognition Society Vo. 40 (2007) pp. 198-211.*
Chulhan Lee et al.; Preprocessing of a Fingerprint Image Captured with a Mobile Camera; Biometrics Engineering Research Center: Seoul, Korea 2006.
B.Y. Hiew et al.; Automatic Digital Camera Based Fingerprint Image Preprocessing; IEEE; pp. 182-189; International Conference on Computer Graphics, Imaging and Visualisation (CGIV'06); 2006.
L. Hong et al.; Fingerprint Image Enhancement: Algorithm and Performance Evaluation; IEEE Transactions on Pattern Analysis and Machine Intelligence; vol. 20, No. 8; 1998.
L. Hong et al.; Fingerprint Enhancement; IEEE WACV, pp. 202-207; 1996.

* cited by examiner

*Primary Examiner* — Brian Le
(74) *Attorney, Agent, or Firm* — Ronald E. Prass, Jr.; Prass LLP

(57) ABSTRACT

A method, a biometric identifier collection device, and a set of instructions are disclosed. A memory 208 may store a digital image having a biometric identifier. A processor 204 may execute a lighting compensation to remove a lighting effect from the biometric identifier. The processor 204 may process the biometric identifier to create an identification profile.

17 Claims, 14 Drawing Sheets

200

400

STANDOFF AND MOBILE FINGERPRINT COLLECTION

BACKGROUND OF THE DISCLOSURE

1. Field of the Invention

The present invention relates to a method and system for creating an identification profile. The present invention further relates to creating an identification profile from a digital image of a biometric identifier using a mobile or standoff device.

2. Introduction

Currently, collection of fingerprints for biometric enrollment and identification may be performed via large peripheral devices or, in a few cases, low-quality integrated sensors intended only for computer access control. Also, current sensor technologies may create the digital image of the fingerprint by having the subject's finger physically touch the sensor. These technology limitations may restrict ease of collection and the mobility of fingerprint collection/identification. Further the current technology may conflict with cultural or sanitation issues regarding touching an object that many other people touch.

SUMMARY OF THE INVENTION

A method, a biometric identifier collection device, and a set of instructions are disclosed. A memory may store a digital image having a biometric identifier. A processor may execute a lighting compensation to remove a lighting effect from the biometric identifier. The processor may process the biometric identifier to create an identification profile.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an electronic device, and a set of instructions, and other embodiments that relate to the basic concepts of the invention. The electronic device may be any manner of computer, mobile device, wireless communication device, or general purpose electronic device. The set of instructions may reside in a storage medium. The set of instructions may be executable by a processor to implement a method for processing digital images.

A method, a biometric identifier collection device, and a set of instructions are disclosed. A memory may store a digital image having a biometric identifier. A processor may execute a lighting compensation to remove a lighting effect from the biometric identifier. The processor may process the biometric identifier to create an identification profile.

Mobile biometric enrollment and identification may be significantly enhanced by forgoing a bulky dedicated sensor. Moreover, when fingerprints are collected in a standoff manner, cultural aversions to touching a common object may be circumvented. The aggregate result may be a broader range of plausible operational scenarios for fingerprint biometric identification.

Figure 1:
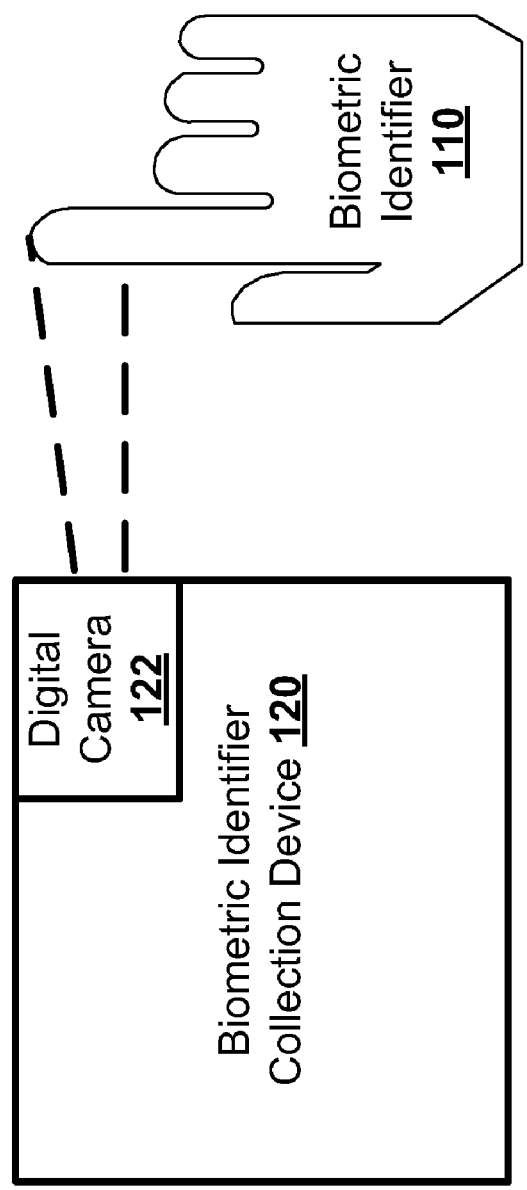
FIG. 1 illustrates, in a block diagram, one embodiment of a biometric identifier capture.

FIG. 1 illustrates, in a block diagram, one embodiment of a biometric identifier capture 100. The biometric identifier (BMI) 110 may be any physical feature of a person that may be used to reasonably distinguish that person and identify them. A common BMI 110 may be a fingerprint, a retina, or an iris. A BMI collection device 120 may be used to capture the BMI 110. The BMI collection device 120 may have a digital camera component 122 to generate a digital image containing the BMI.

Figure 2:
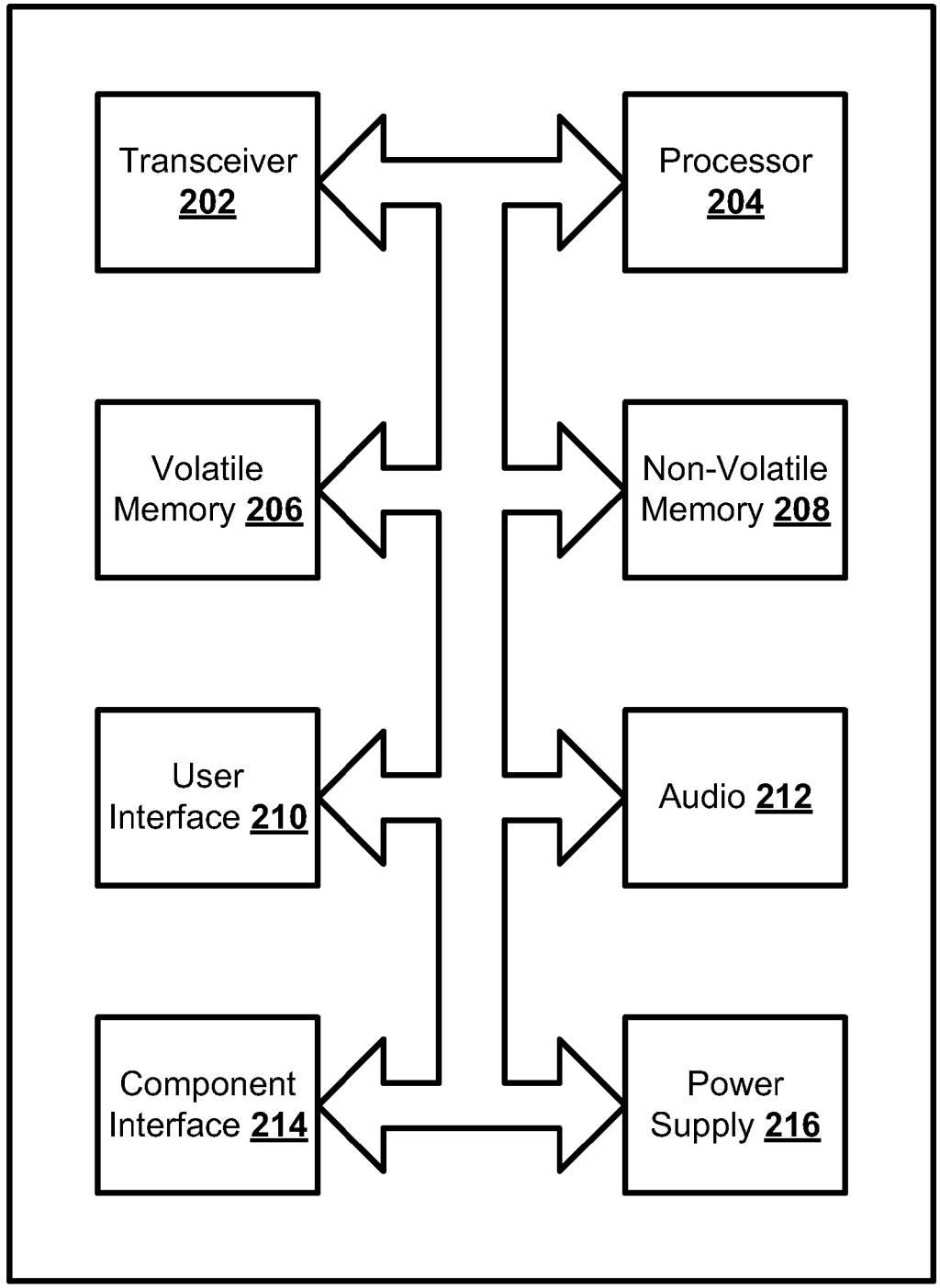
FIG. 2 illustrates, in a block diagram, one embodiment of a mobile device.

FIG. 2 illustrates one embodiment of a computing device 200 that may be used as a BMI collection device 120. The computing device 200 may implement any operating system, such as Windows or UNIX, for example. Client and server software may be written in any programming language, such as C, C++, Java or Visual Basic, for example. The computing device 200 may support one or more applications for performing various communications with the network. The computing device 200 may be a mobile phone, a laptop, a personal digital assistant (PDA), a terminal, or other computing device. For some embodiments of the present invention, the computing device 200 may be a WiFi or Bluetooth® capable device. The computing device 200 may include a network interface 202, such as a transceiver, to send and receive data over the network, such as identification data.

The computing device 200 may include a controller or processor 204 that executes stored programs. The controller or processor 204 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein can be used to implement the disclosed system functions of this invention.

The computing device 200 may also include a volatile memory 206 and a nonvolatile memory 208 to be used by the processor 204. The volatile 206 and nonvolatile data storage 208 may include one or more electrical, magnetic, or optical memories such as a random access memory (RAM), cache, hard drive, or other memory device. The memory may have a cache to speed access to specific data. The memory may also be connected to a compact disc—read only memory (CD-ROM), digital video disc—read only memory (DVD-ROM), DVD read/write input, tape drive or other removable memory device that allows media content to be directly uploaded into the system.

The computing device 200 may include a user input interface 210 that may comprise elements such as a keypad, display, touch screen, or any other device that accepts input. The computing device 200 may also include a user output device that may comprise a display screen and an audio interface 212 that may comprise elements such as a microphone, earphone, and speaker. An image capture device, such as a digital camera component 122, may be connected to the computing device via a component interface 214. Finally, the computing device 200 may include a power supply 216.

Client software and databases may be accessed by the controller or processor 204 from the memory, and may include, for example, database applications, word processing applications, video processing applications as well as components that embody the disclosed functionality of the present invention. The computing device 200 may implement any operating system, such as Windows or UNIX, for example. Client and server software may be written in any programming language, such as C, C++, Java or Visual Basic, for example.

Figure 3:
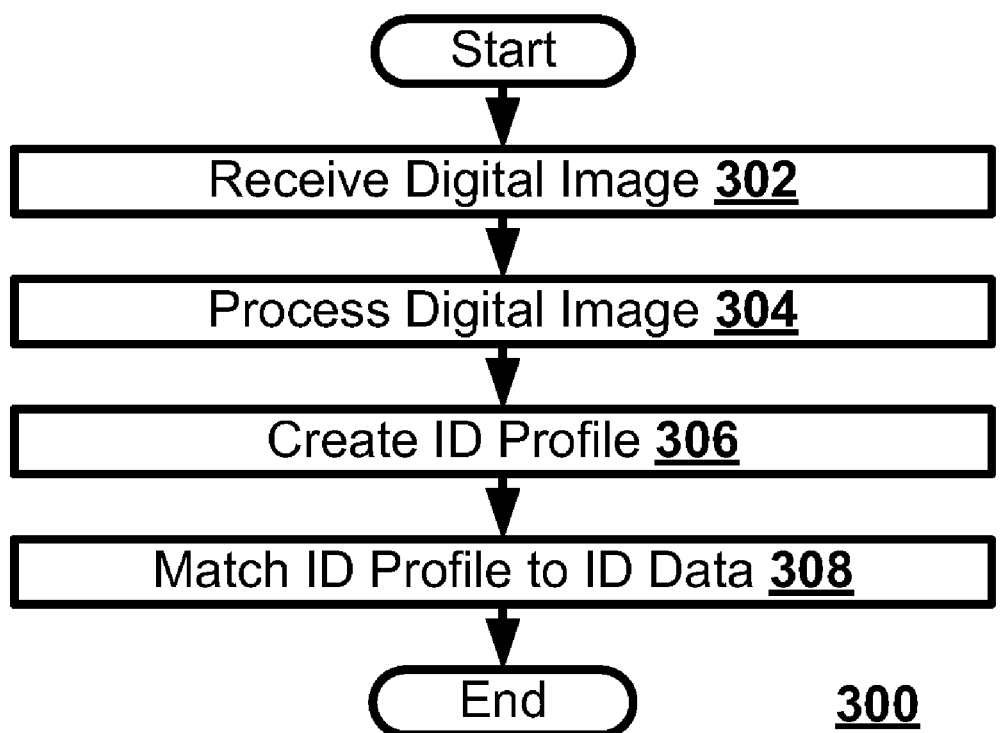
FIG. 3 illustrates, in a flowchart, one embodiment of a method for creating an identification profile.

FIG. 3 illustrates, in a flowchart, one embodiment of a method 300 for creating an identification profile. The BMI collection device 120 may receive a digital image from an attached digital camera component 122 (Block 302). Alternately, the BMI collection device 120 may have the digital image downloaded from a separate digital camera, a different digital image capturing device, a database, a memory, or other image source. The BMI collection device 120 may process the digital image (Block 304). The BMI collection device 120 may create an identification (ID) profile having a set of characteristics that match a BMI to a specific individual (Block 306). The BMI collection device 120 may match the ID profile to stored ID data or ID data downloaded from a network to identify the person having the BMI (Block 308).

Figure 4:
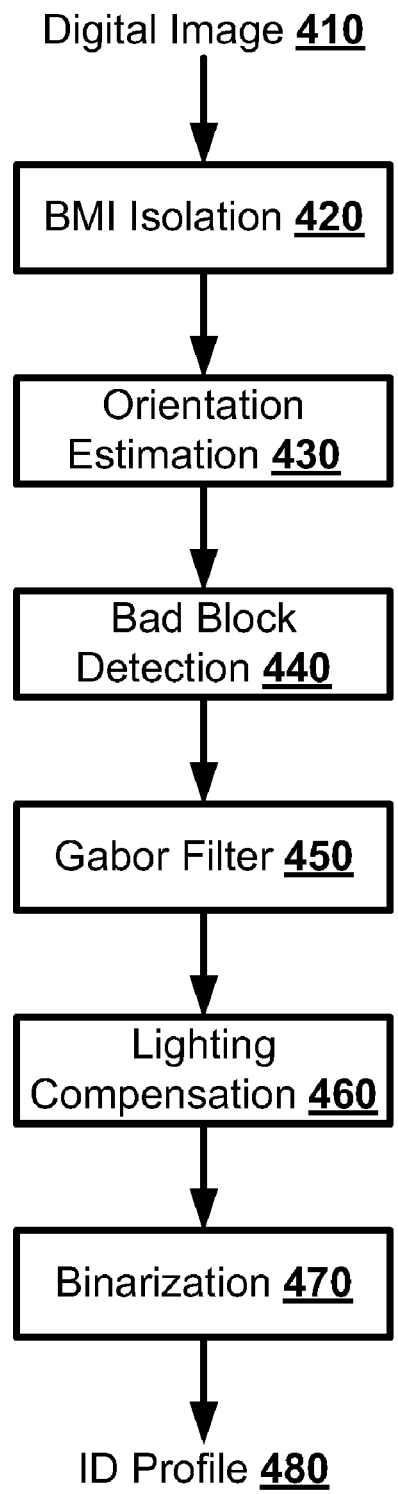
FIG. 4 illustrates, in a block diagram, one embodiment of an identification profile development.

FIG. 4 illustrates, in a block diagram, one embodiment of an identification profile development 400. The BMI collection device 120 may receive a digital image 410 to isolate the BMI 420 from the rest of the digital image 410. The BMI collection device 120 may divide the digital image 410 into blocks and estimate a ridge orientation 430 for each block. The BMI collection device 120 may run a series of bad block heuristics on each block to detect a bad block 440. The BMI collection device 120 may apply multiple passes of a Gabor filter 450 to emphasize ridges and deemphasize valleys. The BMI collection device 120 may perform lighting compensation 460 on the digital image 410 to remove varied lighting effects on the digital image 410. The BMI collection device 120 may binarize 470 the enhanced image 410, by applying an intensity threshold to each pixel of a digital image to determine if the pixel is part of a ridge or not. The detected ridge information may then be used to create an ID profile 480.

Figure 5:
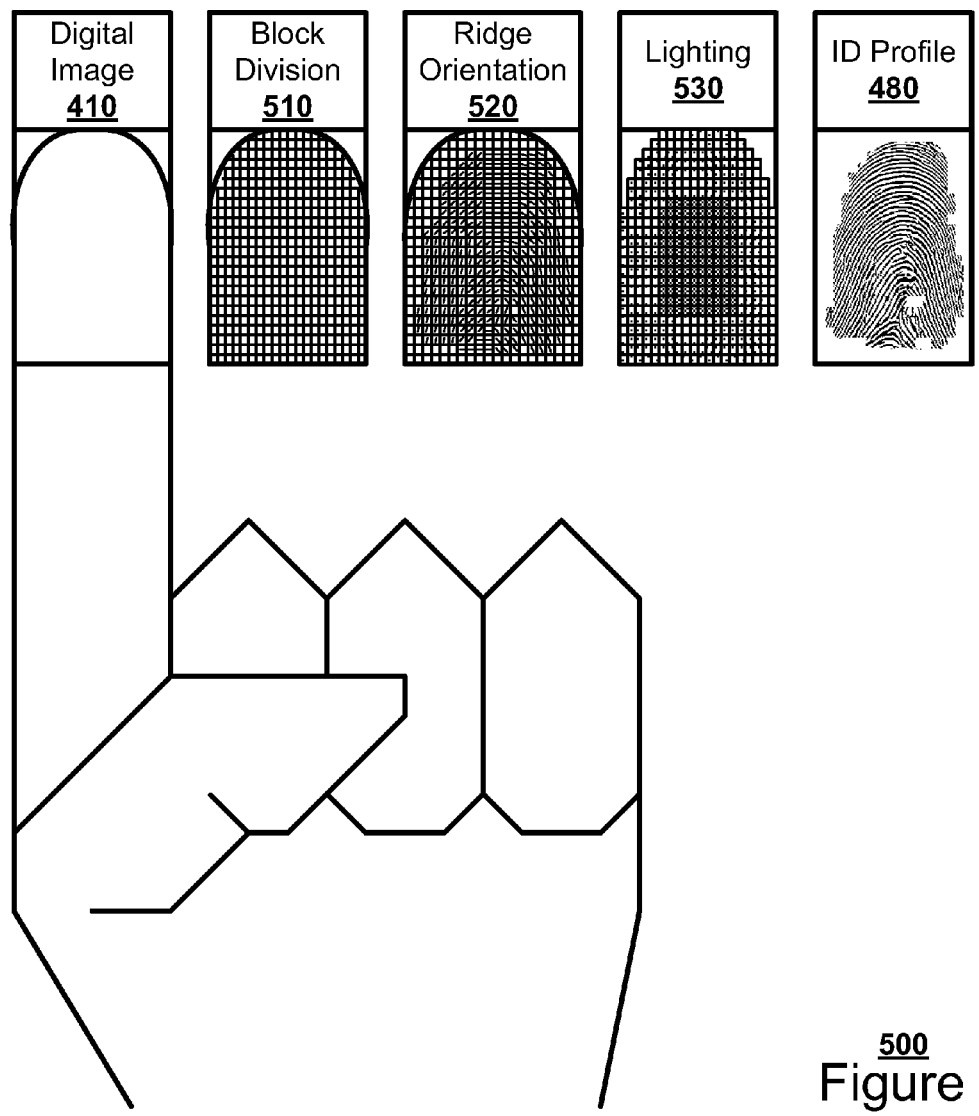
FIG. 5 illustrates, in a block diagram, one embodiment of a set of development stages for an identification profile.

FIG. 5 illustrates, in a block diagram, one embodiment of a set of development stages 500 for an ID profile 480. The BMI collection device 120 may take a digital image 410 of a BMI and divide the digital image 410 into blocks, creating a block division stage 510. The BMI collection device 120 may estimate a ridge orientation for each of the blocks, creating a ridge orientation stage 520. The BMI collection device 120 may perform lighting compensation on a block-by-block basis, creating a lighting compensation stage 530. The BMI collection device 120 may binarize the enhanced image to create the ID profile 480.

Figure 6:
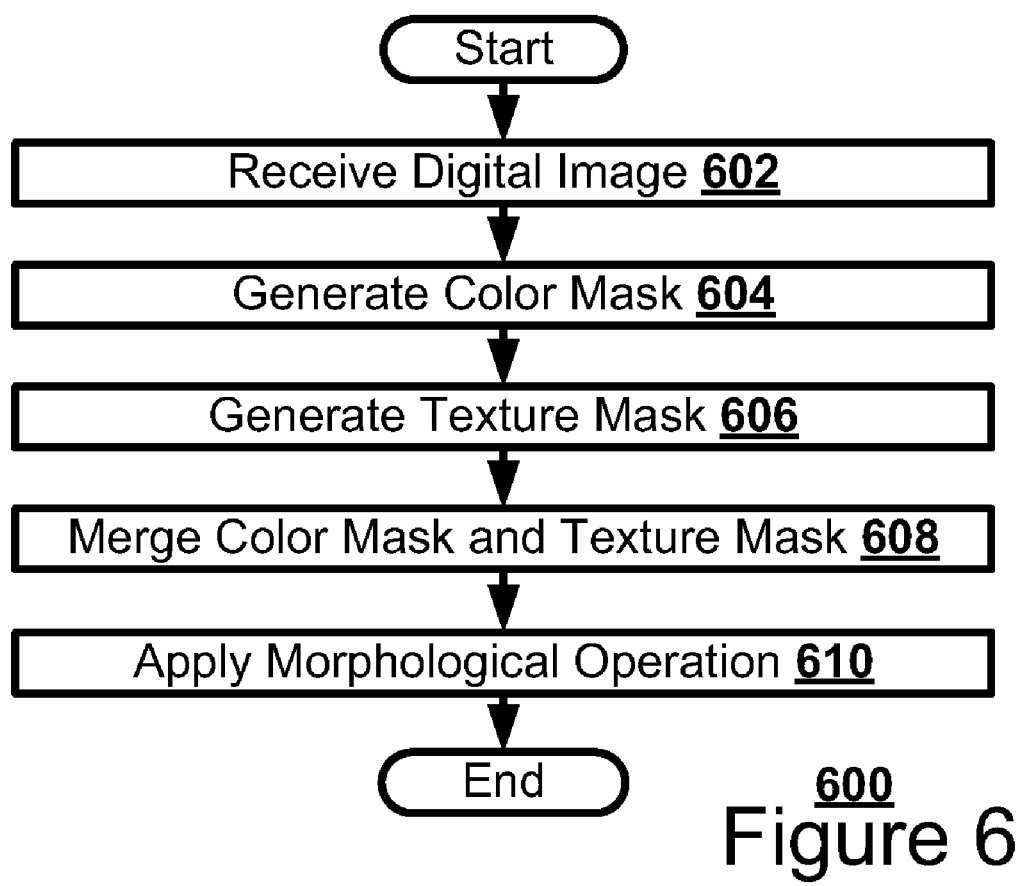
FIG. 6 illustrates, in a flowchart, one embodiment of a method for isolating a biometric identifier.

Upon receiving the digital image 410, the BMI collection device 120 may begin processing the image by isolating the BMI 420. FIG. 6 illustrates one embodiment of a method 420 for BMI isolation. Also referred to as fingerprint segmentation, BMI isolation may be the process of separating the pixels that make up the physical features of the BMI from the pixels that make up the background in the digital image. The segmentation process may perform segmentation based on both color information and texture information. The BMI collection device 120 may receive a digital image 410 (Block 602). The BMI collection device 120 may generate a color mask (Block 604). The BMI collection device 120 may generate a texture mask (Block 606). The BMI collection device 120 may merge the color mask and the texture mask by performing a pixel-wise AND operation of the two masks in order to produce an aggregate mask (Block 608). Neither mask alone may be sufficient to achieve robust BMI segmentation. For example, background objects may have skin-like chrominance or exhibit high-frequency detail despite being out of focus. Both masks together may achieve a more accurate segmentation of the fingerprint from the background of the image. The BMI collection device 120 may apply a series of morphological operations to the aggregate mask to eliminate noise (Block 610). The fingerprint may now be cropped out of the original image.

Figure 7:
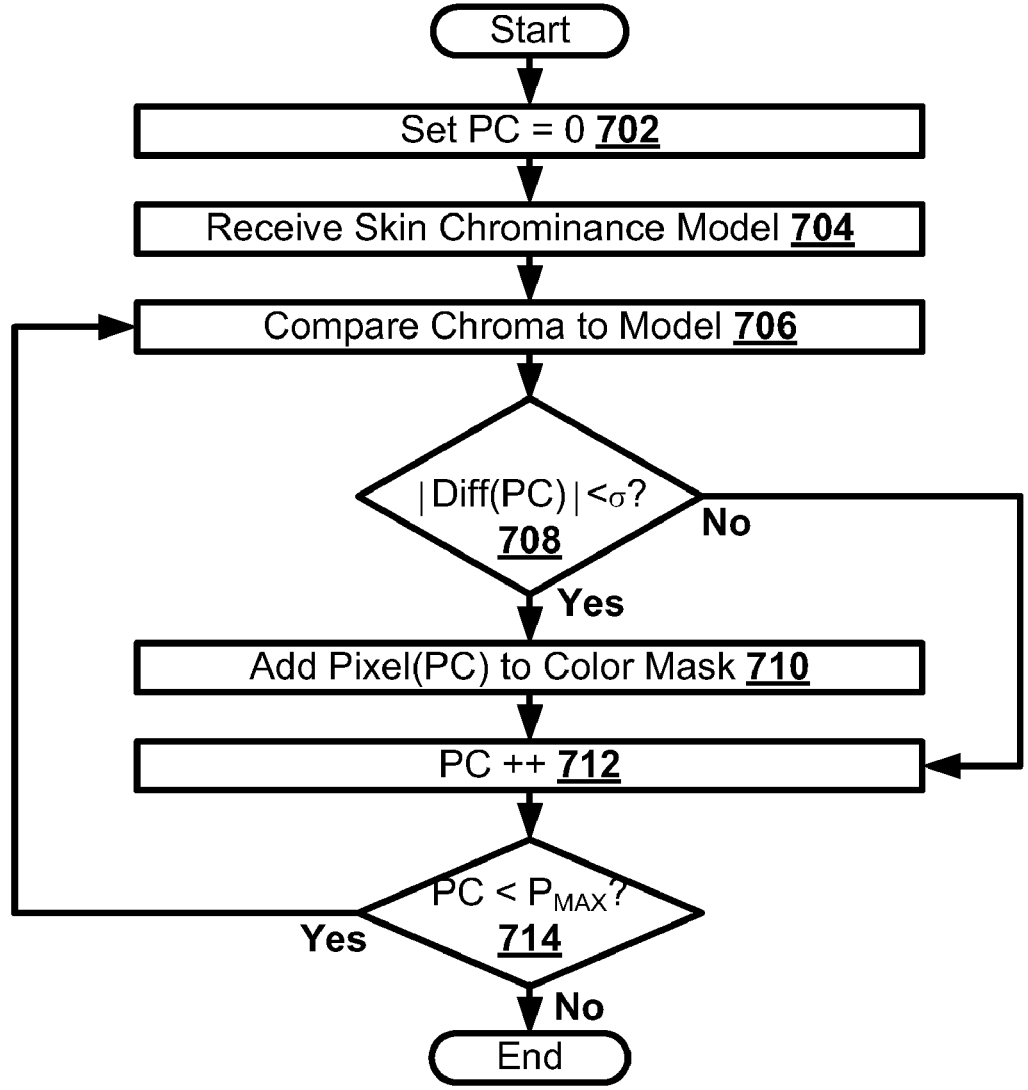
FIG. 7 illustrates, in a flowchart, one embodiment of a method for creating a color mask.

FIG. 7 illustrates one embodiment of a method 700 for generating a color mask. The BMI collection device 120 may go through the digital image on a pixel-by-pixel basis. The BMI collection device 120 may initialize a pixel counter (PC) by setting the PC to zero (Block 702). A linear pixel count is presented merely for simplicity, and should not be seen as dispositive. The brightness-independent skin color, also called chrominance, of the palm and fingers of the human hand may be remarkably consistent between individuals independent of race, ethnicity, or age. As a result, the BMI collection device 120 may determine whether each of the image pixels is of skin color or not, instead being a background pixel. The BMI collection device 120 may receive a skin chrominance model (Block 704). The skin chrominance model may be based on a large number of example skin pixels gathered from digital photographic images. A computer database, either the BMI collection device or some other device, may be used to create the skin chrominance model. A simple user interface for the computer database may allow a user to mark skin pixels via a mouse. The pixel data may be from subjects of various races, ethnicities, and other sub-groups to guarantee sufficient statistical coverage. The red-green-blue pixel color information may be transformed to a luminance (Y) and chrominance (UV) color space, with UV indicating placement on a U-V color plane. The computer database may learn a two dimensional (2D) Gaussian model of the chroma distribution, by computing the mean and standard deviation along both the U axis and the V axis to produce a statistically-sound model of human skin chrominance.

The BMI collection device 120 may create a color mask by application of the skin chrominance model. The BMI collection device 120 may compare the pixel of each chroma (UV) against the mean ($\mu$) and difference of the mean and the actual chroma may be thresholded against a scalar factor ($\alpha$) of the standard deviation ($\sigma$) (Block 706). This threshold may be represented as ($|\mu_U-U|<\alpha\cdot\sigma_U\&\&|\mu_V-V|<\alpha\cdot\sigma_V$). If the difference between the chroma of the pixel PC and the mean of the Gaussian model is less than the scalar factor of the standard deviation $\sigma$ (Block 708), the pixel may be considered to be skin and added to the color mask (Block 710). Otherwise, the pixel may be considered background. The BMI collection device 120 may move to the next pixel by incrementing PC (Block 712). The BMI collection device 120 may examine each pixel until the maximum number of pixels ($P_{MAX}$) is reached. If PC has not moved to the last pixel, as indicated when PC has reached $P_{MAX}$ (Block 714), then the process may restart for the next pixel (Block 706).

In addition to segmentation based on color, the BMI collection device 120 may segment the digital image 410 based on texture by exploiting depth-of-field optical effects. A digital camera may automatically focus on the largest object in the optical field of view. Thus, if a finger or hand occupies the majority of the field of view of the camera, the fingerprint may be in focus while the background may be out of focus. Photographed objects that are out of focus may appear to lack fine detail, or texture, due to blur, while the detail of in-focus objects may be correctly captured within the megapixel resolution of the camera.

Figure 8:
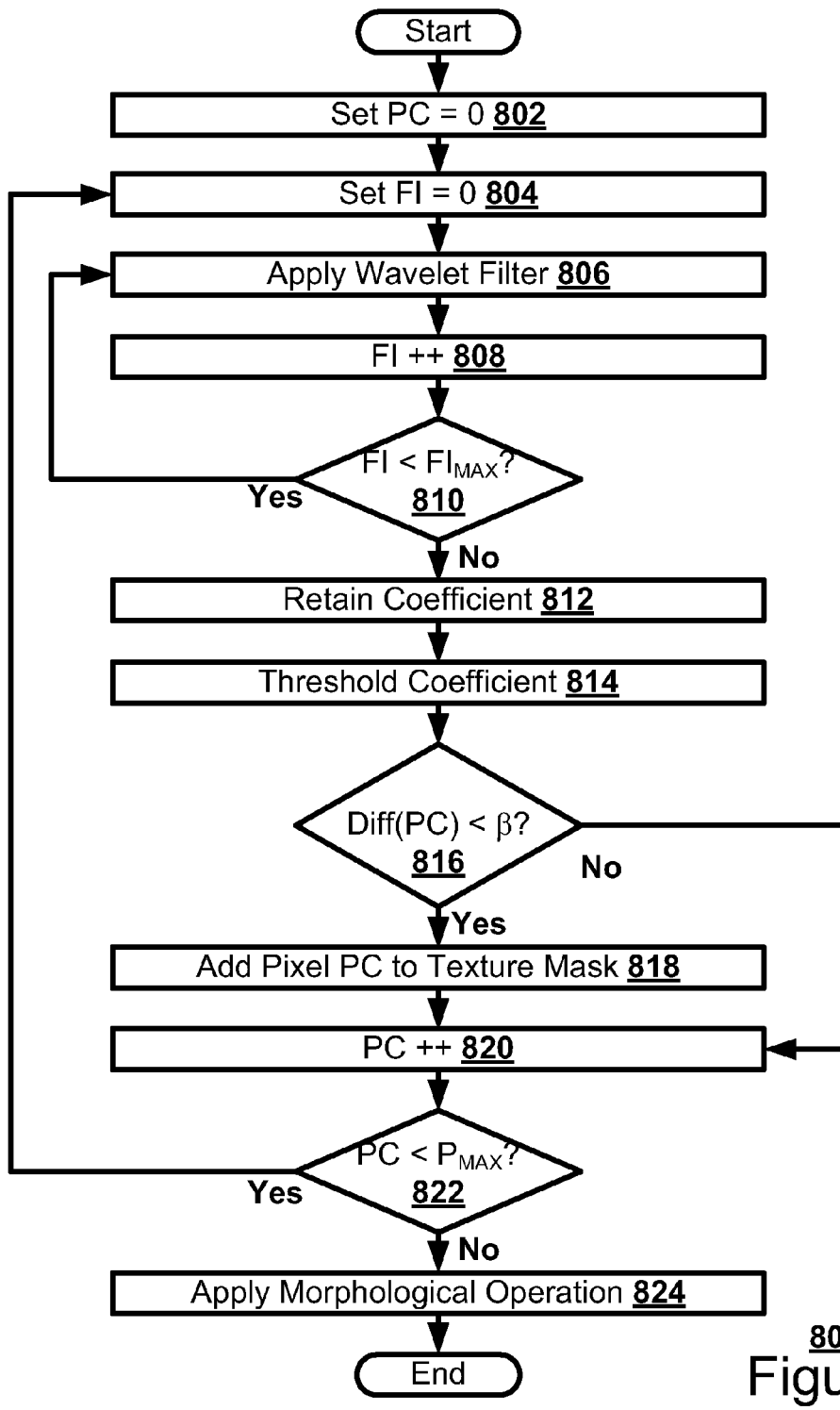
FIG. 8 illustrates, in a flowchart, one embodiment of a method for creating a texture mask.

The BMI collection device 120 may mask the BMI image by detecting the regions of high texture, with local fine detail, versus out-of-focus, blurry regions. FIG. 8 illustrates one embodiment of a method 800 for generating a texture mask. The BMI collection device may go through the digital image on a pixel-by-pixel basis. The BMI collection device 120 may initialize PC by setting the PC to zero (Block 802). A linear pixel count is presented merely for simplicity, and should not be seen as dispositive. The BMI collection device 120 may iteratively apply a wavelet filter to the digital image to create the texture mask. The BMI collection device 120 may use any wavelet transform, such as the Haar wavelet transform. The BMI collection device 120 may run the wavelet filter hierarchically for an empirically-determined number of iterations, determined by the resolution of the fingerprint images. The BMI collection device 120 may initialize a filter iteration counter (FI) to zero (Block 804). The BMI collection device 120 may apply a wavelet filter to the digital image 410 (Block 806). The BMI collection device 120 may increment the FI (Block 808). If the FI is less than the empirically-determined maximum number of iterations ($FI_{MAX}$) (Block 810), the BMI collection device 120 may apply the wavelet filter to the digital image 410 again (Block 806).

In a Haar wavelet transform, the difference between the intensity at pixel PC and the intensity at pixel (PC+1) may be the high-frequency coefficient for pixel PC, or Diff(PC)=I(PC)−I(PC+1). Once the BMI collection device 120 has applied the wavelet filter, the BMI collection device 120 may retain the high-frequency coefficient (Block 812) and threshold that coefficient against an empirically-determined constant ($\beta$) (Block 814). If the difference is less than the empirically-determined constant $\beta$ (Block 816), then the BMI collection device 120 may consider the pixel to be skin and add the pixel to the texture mask (Block 818). Otherwise, the pixel may be determined as background. The BMI collection device 120 may move to the next pixel by incrementing PC (Block 820). The BMI collection device 120 may examine each pixel until the maximum number of pixels ($P_{MAX}$) is reached. If PC has not moved to the last pixel, as indicated when PC has reached $P_{MAX}$ (Block 822), then the process may restart for the next pixel (Block 804). As texture-based masking may be more sensitive to noise and natural appearance variations than color-based masking, the BMI collection device 120 may apply one or more morphological operations to the texture mask (Block 824).

Figure 9:
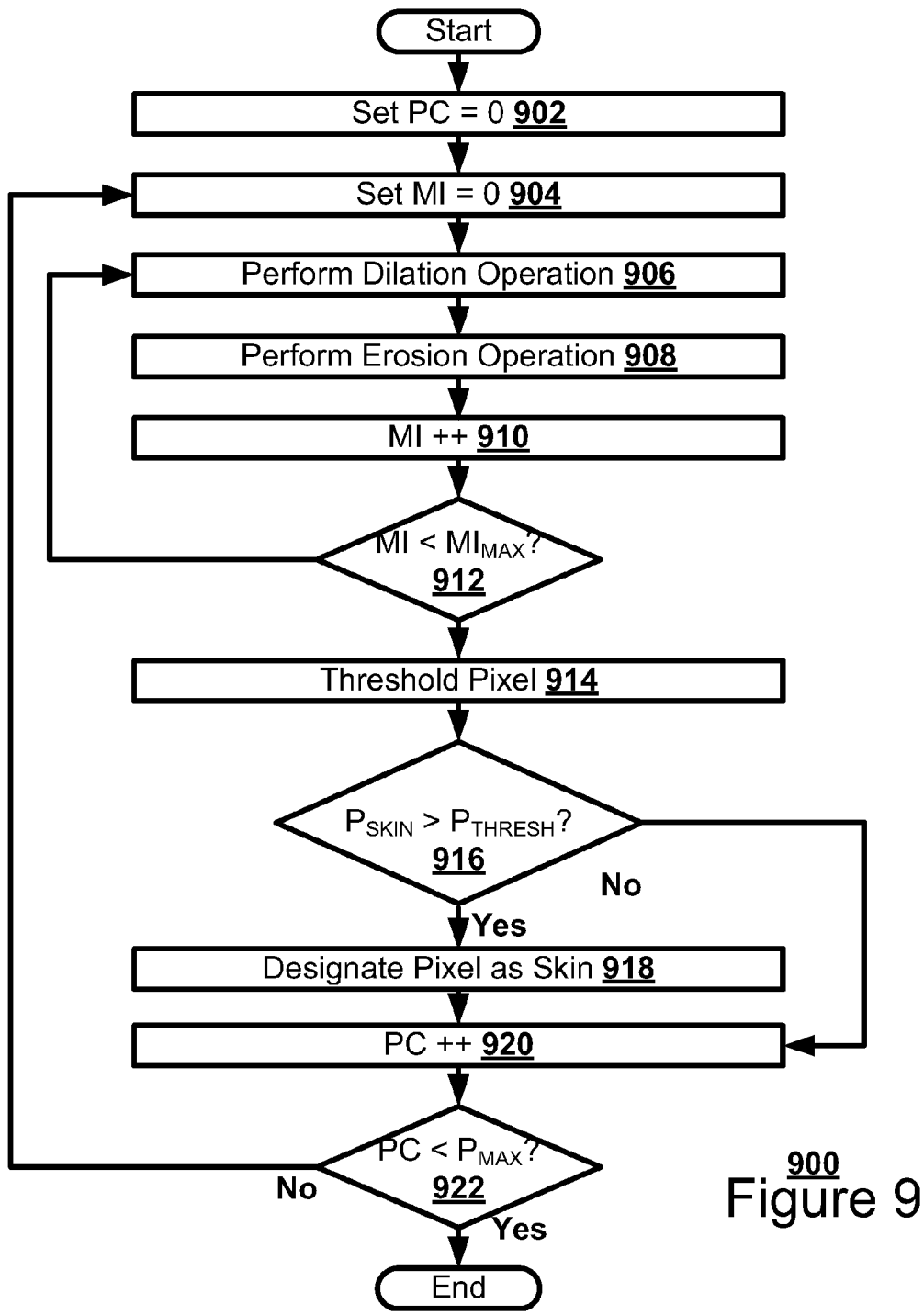
FIG. 9 illustrates, in a flowchart, one embodiment of a method for applying morphological operations to a mask.

FIG. 9 illustrates, in a flowchart, one embodiment of a method 900 for applying morphological operations to a mask. The mask may be a color mask, a texture mask, or an aggregate mask. The BMI collection device 120 may iteratively apply dilation and erosion morphological operations to the aggregate mask on a pixel-by-pixel basis. The BMI collection device may initialize a PC by setting the PC to zero (Block 902). A linear pixel count is presented merely for simplicity, and should not be seen as dispositive. The BMI collection device 120 may iteratively apply the morphological operations to the mask. The BMI collection device 120 may initialize a morphological operation iteration counter (MI) to zero (Block 904). The BMI collection device 120 may perform a dilation operation (Block 906). The BMI collection device 120 may perform an erosion operation (Block 908). After applying a morphological operation, the BMI collection device 120 may increment the MI (Block 910). If the MI is less than the predetermined maximum number of iterations ($MI_{MAX}$) (Block 912), the BMI collection device 120 may apply the morphological operations again (Block 906). Three dilations followed by three erosions may be effective for fingerprint images of 512×512 resolution.

The BMI collection device 120 may count the number of skin pixels centered around each pixel location as part of these morphological operations. The BMI collection device may then threshold the pixel count (Block 914). If the count of the neighboring pixels designated as a skin pixel ($P_{SKIN}$) is above a predetermined threshold ($P_{THRESH}$) (Block 916), the BMI collection device 120 may designate the pixel as skin (Block 918). The BMI collection device 120 may move to the next pixel by incrementing PC (Block 920). The BMI collection device 120 may examine each pixel until the maximum number of pixels ($P_{MAX}$) is reached. If PC has not moved to the last pixel, as indicated when PC has reached $P_{MAX}$ (Block 922), then the process may restart for the next pixel (Block 904).

The masking process may result in a cropped image of the fingerprint. The fingerprint ridges may be faintly visible in the color image. However, the ridges may lack the sharp contrast attainable with touch fingerprint scanners or traditional ink-and-paper fingerprinting. To achieve accurate fingerprint biometric identification with photographic images, the BMI collection device 120 may enhance the low-contrast fingerprint ridges to appear like traditional fingerprints. The BMI collection device 120 may estimate the orientations of the ridges throughout the image.

Figure 10:
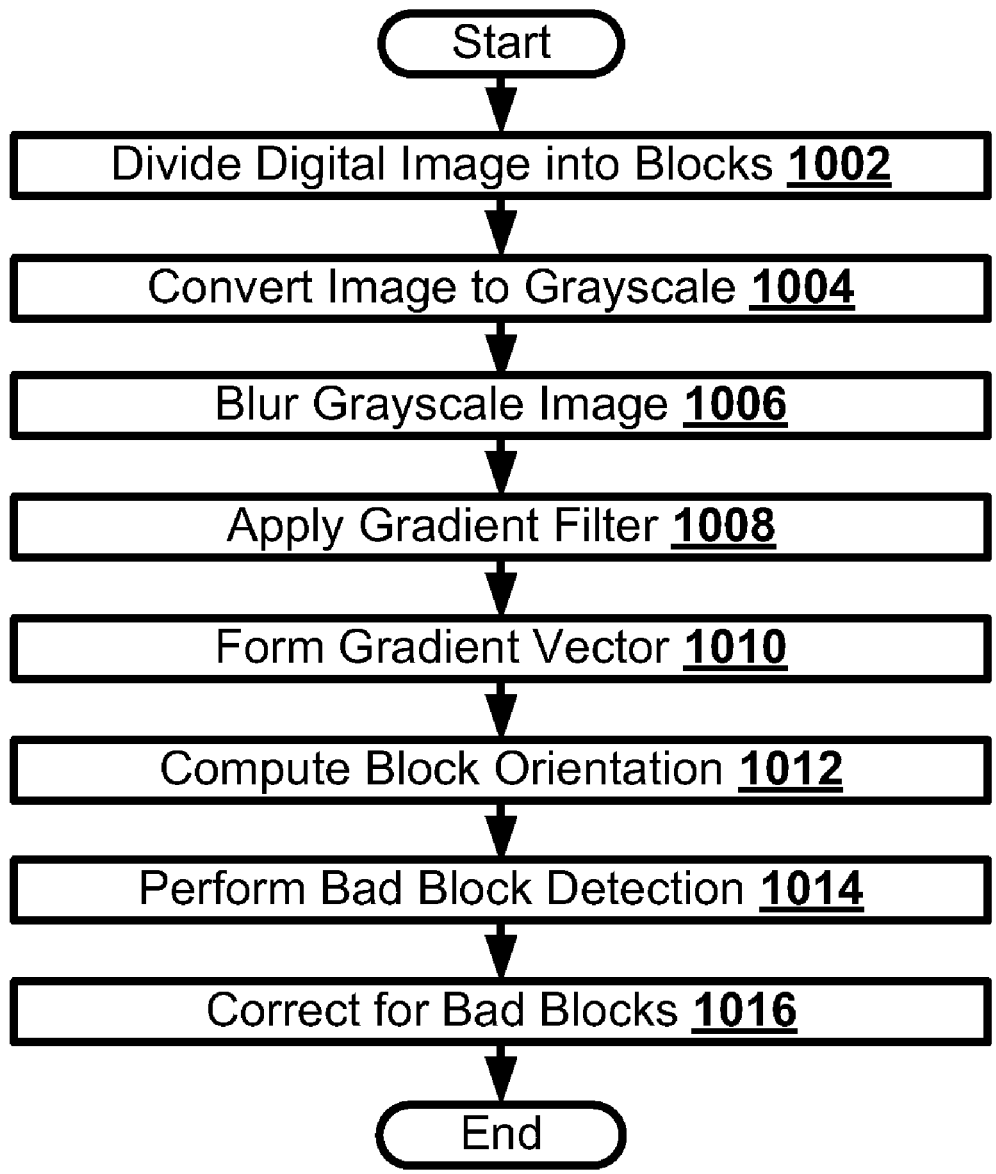
FIG. 10 illustrates, in a flowchart, one embodiment of a method for estimating ridge orientation.

FIG. 10 illustrates one embodiment of a method 1000 for ridge orientation. The BMI collection device 120 may divide the digital image 410 into a grid of blocks (Block 1002). The BMI collection device 120 may convert the digital image 410 into a grayscale image (Block 1004). The BMI collection device 120 may slightly blur the grayscale image to lessen the influence of noisy pixel intensities (Block 1006). The BMI collection device 120 may apply a gradient filter, such as a Sobel filter, to the image along both the horizontal and vertical axes (Block 1008). The BMI collection 120 may form a gradient vector for each pixel location (Block 1010). The BMI collection device 120 may compute the principal gradient orientation for each block using a least-square fit, thus determining the ridge orientation for each block (Block 1012). The BMI collection device 120 may perform a series of bad block detection heuristics to detect bad blocks (Block 1014). The BMI collection device 120 may then correct for the bad blocks (Block 1016).

The BMI collection device 120 may divide the digital image 410 into a regular grid of pixel blocks to compute the principal ridge orientation in a per-block manner, allowing for a semi-local approximation of the orientation. A fully local, per-pixel orientation estimation may be undesirable due to significant noise in the individual pixels. The BMI collection device 120 may divide a 512×512 digital image 410 into a grid of 16×16 blocks. The BMI collection device 120 may scale the digital image 120 to this resolution after cropping. Each 16×16 block may represent one discrete area of fingerprint ridges. Keeping each block small with respect to the entire fingerprint may allow the block to contain fairly homogeneous ridge orientations.

Fingerprint ridges may form a wave-like pattern, and thus naturally vary in apparent brightness under typical lighting conditions. The local average gradients in the pixel intensities may be orthogonal to the ridge orientations. The BMI collection device 120 may convert the color fingerprint image to a grayscale, or intensity image, in preparation for gradient analysis. The BMI collection device 120 may slightly blur the grayscale image to combat noisy pixel intensities, such as applying a 5×5 Gaussian blur for three iterations. Next, the BMI collection device 120 may apply a gradient filter, such as a Sobel filter, to the image along both the horizontal and vertical axes, resulting in two axis-aligned gradient images. Finally, for each pixel location, the BMI collection device 120 may combine the co-located horizontal and vertical gradients to form a two-dimensional <x,y> gradient vector. The BMI collection device 120 may organize the gradients by block.

The BMI collection device 120 may compute the block orientation via a least-square fit. The BMI collection device 120 may compute the block orientation, or least-square fit, using the following equations:

$$\Delta x = \sum_{i=1}^{W} \sum_{j=1}^{W} 2 G_x(i,j) G_y(i,j),$$

$$\Delta y = \sum_{i=1}^{W} \sum_{j=1}^{W} (G_x^2(i,j) - G_y^2(i,j)),$$

$$\theta = \frac{1}{2}\tan^{-1}\left(\frac{\Delta x}{\Delta y}\right),$$

where $G_x$ and $G_y$ are the horizontal (X) and vertical (Y) gradients respectively, W is the size of the block along each axis, and θ is the estimate block orientation. Specifically, by anchoring each gradient vector to the origin, the BMI collection device 120 may treat the block orientation as a set of two-dimensional points. The BMI collection device 120 may fit a line that passes through the origin to this point set. The BMI collection device 120 may consider the resulting line orientation to be the principal orientation of the ridges within the block.

The orientation estimation may fail if the pixels within a block are of too low a quality. Most typically, this estimation may fail from insufficient visible ridge detail or a significant epidermal blemish, such as a scar or crease. The BMI collection device 120 may detect and, when possible, correct these errors.

The BMI collection device 120 may perform detection and correction once the orientations have been estimated for all blocks. Due to the poor quality of photographic images of fingertips, incorrect orientations may occur in a notable but typically modest percentage of blocks. Fortunately, ridge orientation may vary slowly across the fingerprint. The BMI collection device 120 may correct bad block orientations by exploiting correct orientations from neighboring blocks. Specifically, the BMI collection device 120 may sort the valid neighbor orientations and assign the median neighbor orientation to the current block. This remediation may be represented by the equation:

$$\theta(u, v) = \underset{(i,j)\in N}{\text{median}}(\theta(i, j)),$$

where N is the set of blocks neighboring the current block at location (u,v). In other words, the neighboring blocks may vote and the BMI collection device 120 may assign the most conservative estimate to the current block. In the case where a block is surrounded by mostly or entirely bad blocks, the BMI collection device 120 may deem the current block unrecoverable.

For certain fingers and photographic images, certain blocks may not contain useable data. The intensity variations of the rise and fall of the ridges may not be statistically significant in comparison to non-ridge data or noise in the block. The BMI collection device 120 may have difficulty acquiring useable fingerprint data from such blocks because of the lack of input data. The BMI collection device 120 may detect and ignore these blocks to avoid outputting false ridges.

Bad block detection may be made challenging by the nature of the data. The photographic images may have significantly less contrast than traditional fingerprinting methods. The quality of ridge data in a photographic image may be impacted by poor lighting, motion blur, depth-of-field blur, and other factors. Thus traditional approaches to bad block detection may be insufficient.

Figure 11:
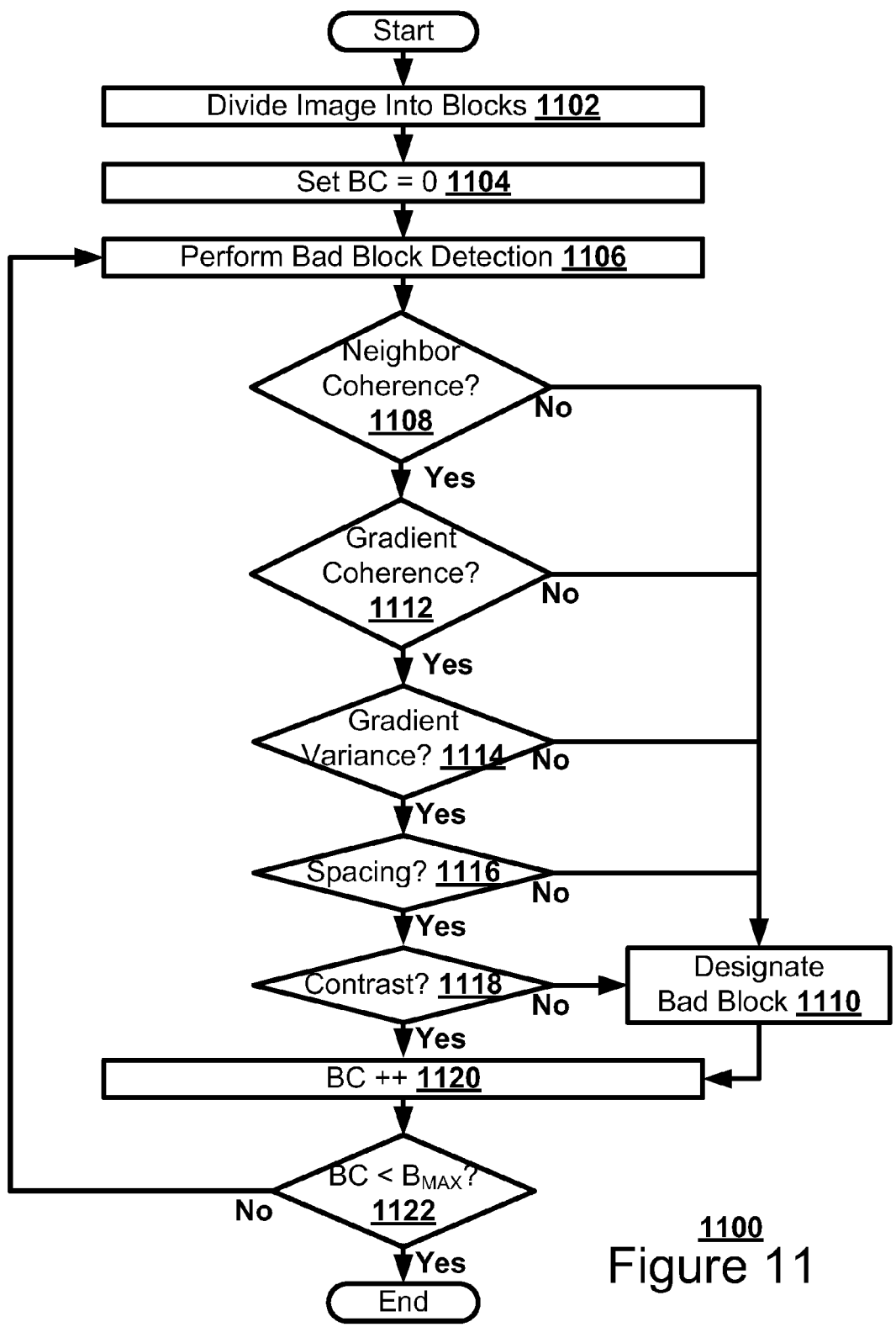
FIG. 11 illustrates, in a flowchart, one embodiment of a method for bad block detection.

Due to the diverse set of environmental factors that may impact a fingerprint photograph, the BMI collection device 120 may employ multiple heuristics to detect bad blocks. The BMI collection device may use these heuristics in conjunction by treating each as a separate pass/fail test. FIG. 11 illustrates one embodiment of a method 1100 for bad block detection. The BMI collection device 120 may divide the digital image into a grid of blocks (Block 1102). This action may be done as part of the ridge orientation estimation. The BMI collection device 120 may initialize a block counter (BC) to zero (Block 1104). A linear block count is presented merely for simplicity, and should not be seen as dispositive. The BMI collection device 120 may perform a series of bad block detection tests on block BC (Block 1106).

If block BC fails a neighborhood orientation coherence test (Block 1108), then the BMI collection device 120 may designate the block as a bad block (Block 1110). The neighborhood orientation coherence test may detect blocks that contain too much noise or epidermal blemishes. In the neighborhood orientation coherence test, the BMI collection device 120 may compare the orientation of each block against the immediately neighboring blocks. The BMI collection device 120 may deem the block orientation bad if the block has a significant deviation. Specifically, if $$V > \frac{1}{|N|}\sqrt{\sum_{(i,j)\in N}|\theta(i,j)-\theta(u,v)|^2},$$

where N is the set of blocks neighboring the current block at location (u,v) and V is a scalar threshold, then the orientation may be bad.

If block BC fails a gradient coherence test (Block 1112), then the BMI collection device 120 may designate the block as a bad block (Block 1110). In a gradient coherence test, the BMI collection device 120 may measure the similarity of the horizontal (x) and the vertical (y) gradients within a given block. Similar to neighborhood orientation coherence test, the gradient coherence test may detect blocks that contain overly noisy data or epidermal blemishes. However, the gradient coherence test may be of a different scale than the neighborhood orientation coherence test by operating in an intra-block fashion directly on pixel gradients. This complementary heuristic may provide additional robustness. The BMI collection device 120 may compute the gradient coherence using the following equations:

$$Gxx = \sum\sum Gx^2,$$
$$Gxy = \sum\sum GxGy,$$
$$Gyy = \sum\sum Gy^2,$$
$$C = \frac{\sqrt{(Gxx-Gyy)^2 + 4Gxy^2}}{Gxx+Gyy},$$

where Gx and Gy are the gradients and the summations iterate over all pixel locations in the current block.

If block BC fails a gradient variance test (Block 1114), then the BMI collection device 120 may designate the block as a bad block (Block 1110). In the gradient variance test, the BMI collection device 120 may compute the median gradient of the block BC. If a sufficient number of pixels have a gradient that varies from the median gradient by more than a preset threshold, the block may fail the gradient variance test.

If block BC fails a ridge spacing test (Block 1116), then the BMI collection device 120 may designate the block as a bad block (Block 1110). In the ridge spacing test, the BMI collection device 120 may determine that the block data is erroneous if the spacing between ridges lies outside a plausible range. The BMI collection device 120 may compute the spacing in number of pixels and compare that spacing to an upper and lower bound.

If block BC fails a ridge-valley contrast test (Block 11118), then the BMI collection device 120 may designate the block as a bad block (Block 1110). In the ridge-valley contrast test, the BMI collection device 120 may compute the average pixel intensity for both ridges and valleys in the block. The difference between these averages may be a useful measure of ridge clarity. The BMI collection device 120 may threshold this difference against a lower bound.

The BMI collection device 120 may move to the next block by incrementing the BC (Block 1120). If the BC has not reached the final block ($B_{MAX}$) (Block 1122), the BMI collection device 120 may perform the series of bad block detection tests on the next block (Block 1106).

Alternatively, for more robust bad block detection, the BMI collection device 120 may utilize each bad block heuristic as a separate input feature for a machine learning classifier. In contrast to simply using each test individually, an appropriate machine learning system, such as a support vector machine, may classify block acceptability based on a non-linear combination of all of the heuristics. The inputs of the machine learning system may either be the scalar results of each heuristic or threshold results.

The BMI collection device 120 may use Gabor filtering to enhance a fingerprint. The Gabor wavelet may have a local, fingerprint-ridge-like pattern of waves. Thus, a Gabor filter may naturally emphasize fingerprint ridges and deemphasize valleys. For execution efficiency, the BMI collection device 120 may sample the Gabor wavelet into a convolution kernel for filtering. The BMI collection device 120 may use a separate convolution kernel for each block, based on the orientation of the ridges within that block.

Figure 12:
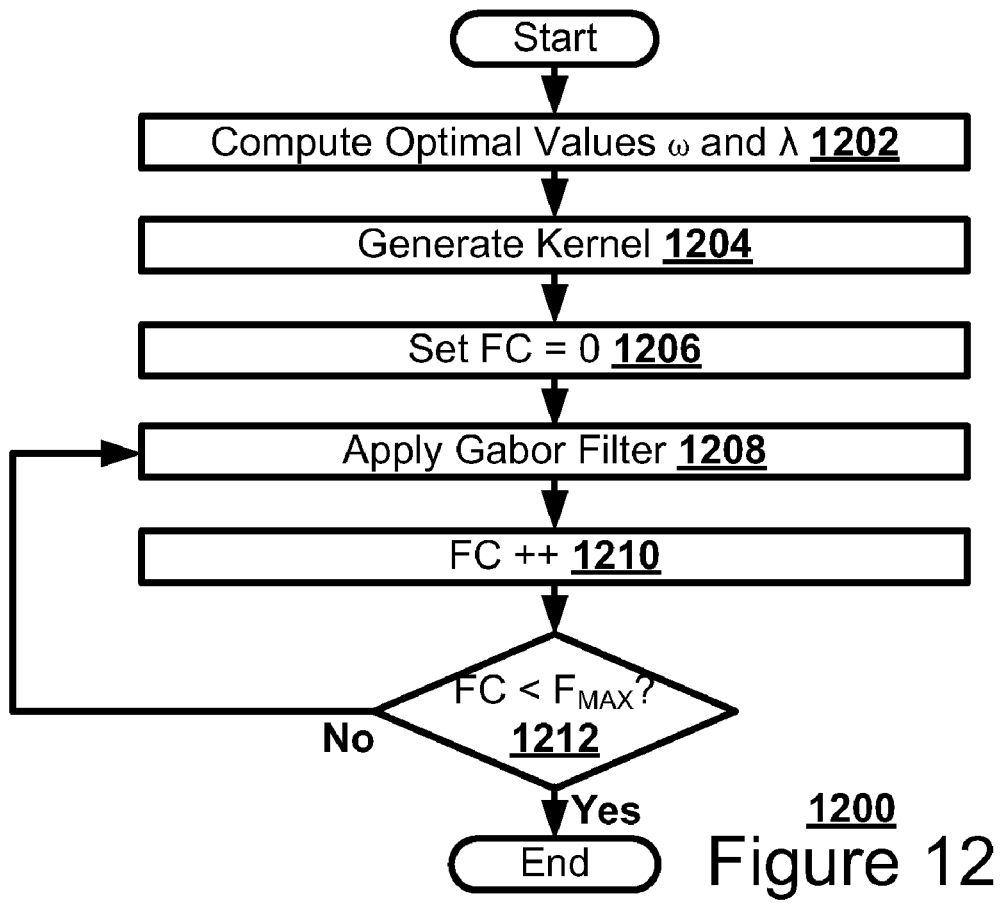
FIG. 12 illustrates, in a flowchart, one embodiment of a method for application of the Gabor filter.

FIG. 12 illustrates one embodiment of a method 1200 for application of the Gabor filter. The BMI collection device 120 may compute the optimal values of the wavelength scale $\lambda$ of the cosine factor and the size $\omega$ of the Gaussian support (Block 1202). The BMI collection device 120 may generate the Gabor kernel for the solved wavelength scale $\lambda$ and size $\omega$ (Block 1204). The BMI collection device 120 may generate the Gabor kernel by evaluating the following set of equations at various (x,y) locations throughout the kernel matrix:

$$x' = x\cos\theta + y\sin\theta,$$
$$y' = -x\sin\theta + y\cos\theta,$$
$$g(x,y;\lambda,\theta,\omega) = \exp\left(\frac{x'^2+y'^2}{2\omega^2}\right)\cos\left(2\pi\frac{x'}{\lambda}\right),$$

where (x,y) is the normalized location being evaluated, $\lambda$ is the wavelength scale of the cosine factor, $\theta$ is the orientation of the waves, and $\omega$ defines the size of the Gaussian support.

The values of (x,y) may be known due to the filling of the kernel matrix. Wave orientation $\theta$ may be defined by the ridge orientation within the block plus $\pi/2$. The Gabor waves may be oriented orthogonally to the ridges so that the lobes align with the ridges. The BMI collection device 120 may automatically compute the optimal values of $\lambda$ and G.

Known values may include the average number of pixels between fingerprint ridge crests ($\Delta p$) and the dimensions of the Gabor kernel to be generated (Ksize). These known values may form the following equation:

$$\Delta p = \frac{c}{\lambda} \cdot Ksize,$$

where c is a constant and $\lambda$ is the wavelength coefficient parameter from the Gabor equation. According to this equation, the pixel spacing between the ridge wave crests, or cosine wave crests, may be determined by the size of the kernel divided by the wavelength coefficient, modulated by a scalar constant. According to the assumptions of the equation, the kernel may occupy a unit space [−1,1]. Thus, the larger the kernel dimensions, the more pixels that may lie between each ridge or cosine crest.

The equation may be re-written as follows:

$$\lambda = \frac{c}{\Delta p} \cdot Ksize.$$

Thus, the BMI collection device 120 may compute λ given the kernel size and known crest spacing. The BMI collection device 120 may generate a Gabor kernel with cosine crest spacing of a specified number of pixels.

The constant c may be determined by observing that the simplified cosine factor of the Gabor equation, $\cos(2\pi x/\lambda)$, traverses one full wavelength for each increment of x+1 when λ is unity. Thus, since the normalized kernel spans [−1,1] in both axes, the kernel may have two wavelengths. Thus, the equation may use a scale of constant c=0.5, and be re-written as follows:

$$\lambda = \frac{0.5}{\Delta p} \cdot Ksize$$

Similarly, if Δp represents the number of pixels between ridges and adjacent valleys, then the equation may use a constant c=0.25.

The BMI collection device 120 may apply multiple iterations of the Gabor filter to the digital image. The BMI collection device 120 may initialize a filter counter (FC) by setting to zero (Block 1206). The BMI collection device 120 may apply a first iteration of the Gabor filter to the digital image (Bock 1208). The BMI collection device 120 may increment the FC (Block 1210). If the FC has not reached a preset number of filtering ($F_{MAX}$) (Block 1212), then the BMI collection device 120 may apply additional iterations of the Gabor filter (Block 1208).

The frequency response from the side lobes of the Gabor filter may be reduced by multiplying the filter by itself in the frequency domain. Multiple iterations of the Gabor filter or convolving the kernel by itself may increasingly dampen noisy frequencies and result in improved enhancement. The BMI collection device 120 may achieve this by executing the filter multiple times. Alternatively, for increased execution efficiency, the BMI collection device 120 may convolve the kernel by itself before applying the filter. This convolution may be equivalent to multiplying the kernel by itself in the frequency domain. Convolution and multiple iterations may be equivalent within machine precision.

Traditional fingerprint enhancement may not consider varied lighting conditions due to processing data collection via touch. Lighting may naturally vary during free-form photography of fingertips in different environments. Lighting may significantly impact the visual appearance of fingerprint ridges.

Figure 13:
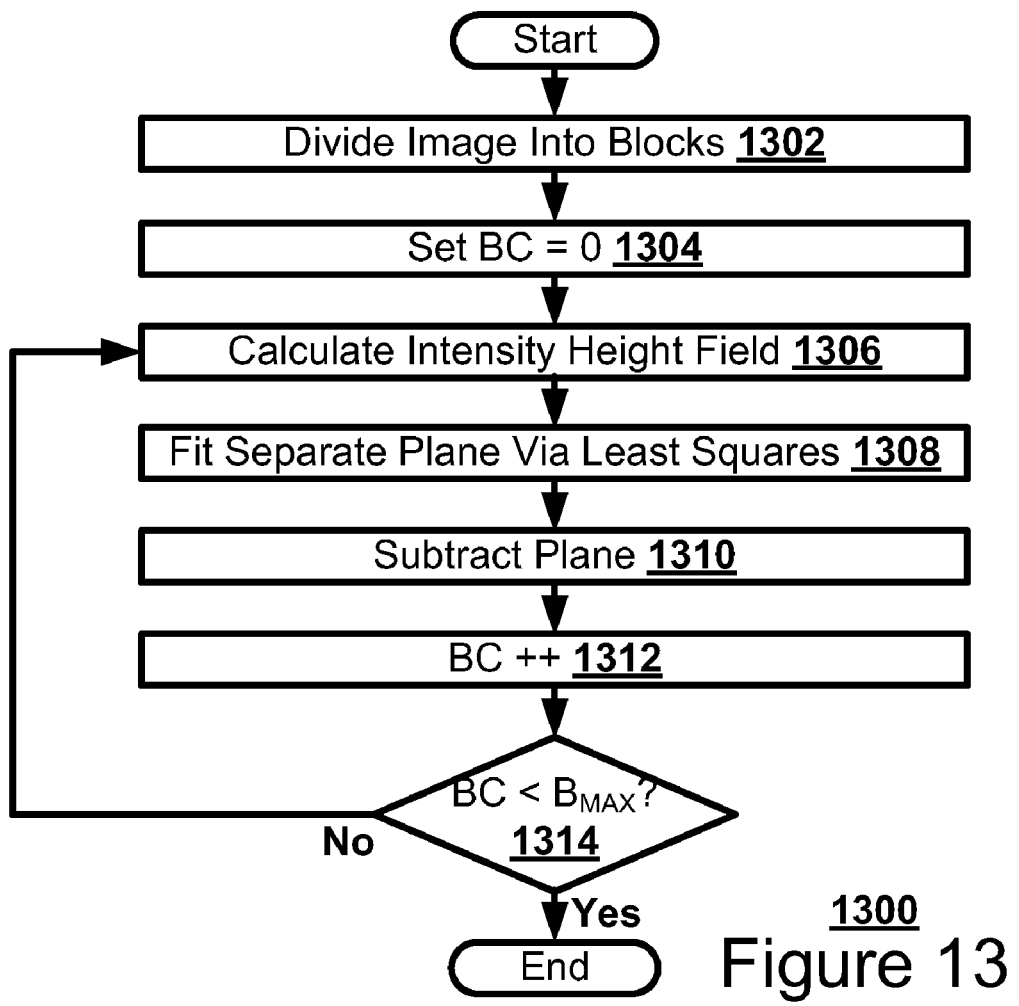
FIG. 13 illustrates, in a flowchart, one embodiment of a method for performing a lighting compensation.

The BMI collection device 120 may execute a piece-wise transformation of the light intensity for each block of the digital image. FIG. 13 illustrates, in a flowchart, one embodiment of a method for lighting compensation. The BMI collection device 120 may divide the digital image into a grid of blocks (Block 1302). This action may be done as part of the ridge orientation estimation. The BMI collection device 120 may initialize a BC to zero (Block 1304). A linear block count is presented merely for simplicity, and should not be seen as dispositive. The BMI collection device 120 may calculate the intensity height field of the block BC (Block 1306). The BMI collection device 120 may fit the separate plane to the intensity height field of block BC via a least-squares calculation (Block 1308). The BMI collection device 120 may compute the calculation rapidly in closed form. The BMI collection device 120 may then subtract the plane from block BC (Block 1310). The BMI collection device 120 may move to the next block by incrementing the BC (Block 1312). If the BC has not reached the final block (Block 1314), the BMI collection device 120 may calculate the intensity height field of the next block (Block 1306). The lighting compensation may remove shading due to Lambertian shading of the surface, with the ridges left intact. Each block may represent only a small piece of the entire fingerprint.

The BMI collection device may apply lighting compensation immediately preceding binarization of the image. Applying the lighting compensation before the Gabor filtering may result in block-edge intensity discontinuities, which may bias the convolution. The BMI collection device may perform lighting compensation previous to orientation estimation for somewhat increased accuracy if the light-compensated image is discarded before filtering.

Finally, the BMI collection device 120 may binarize the enhanced image. The BMI collection device may threshold the intensity of each pixel to determine if that pixel is part of a ridge or not. Thus the output of the binarization may be a black-and-white image that resembles a traditional fingerprint.

Figure 14:
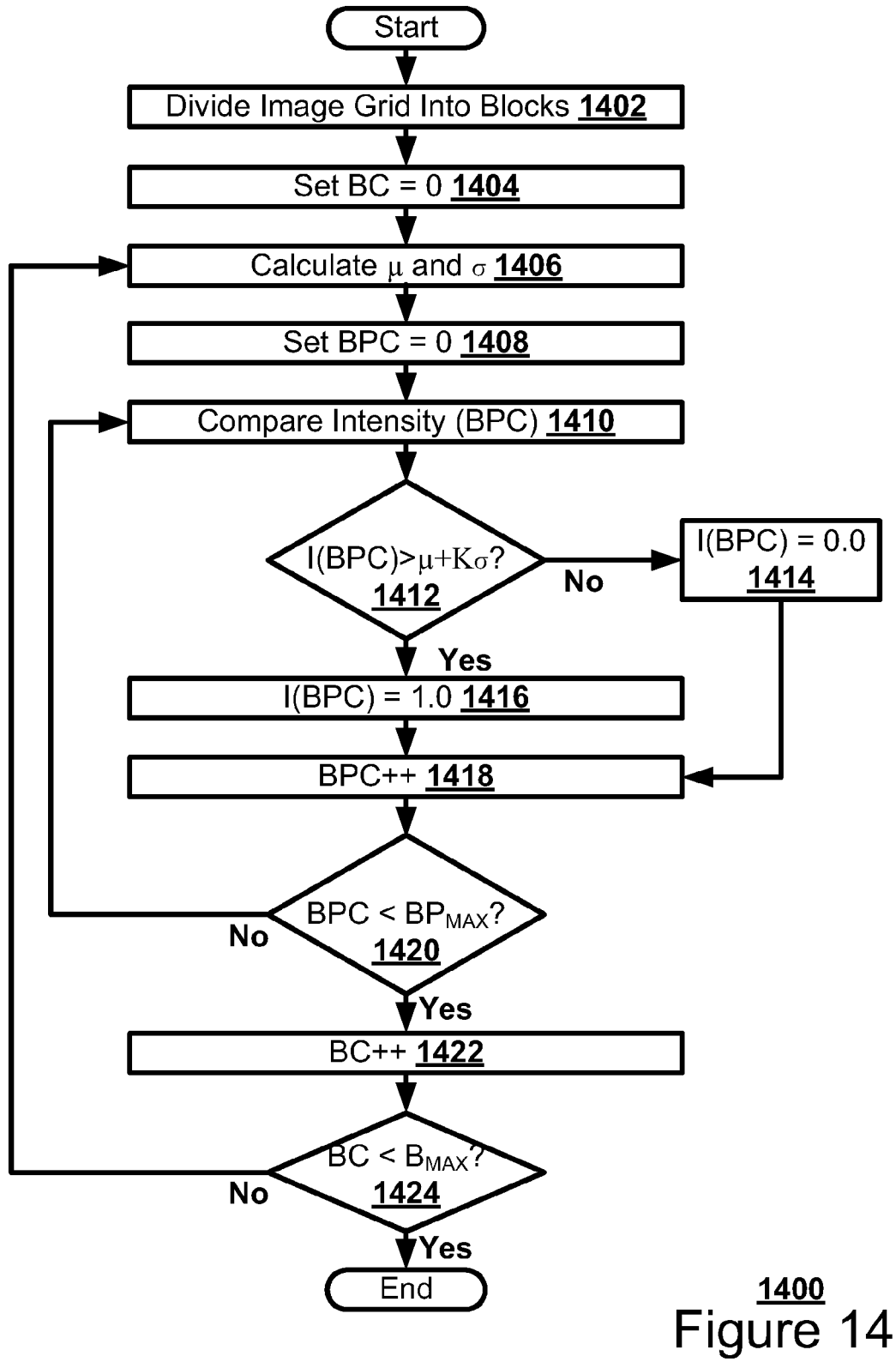
FIG. 14 illustrates, in a flowchart, one embodiment of a method for performing a binarization.

FIG. 14 illustrates, in a flowchart, one embodiment of a method for binarization. The BMI collection device 120 may perform the binarization in a block-by-block manner since lighting compensation results in intensity discontinuities between blocks. The BMI collection device 120 may divide the digital image into a grid of blocks (Block 1402). This action may be done as part of the ridge orientation estimation. The BMI collection device 120 may initialize a block counter BC to zero (Block 1404). A linear block count is presented merely for simplicity, and should not be seen as dispositive. The BMI collection device 120 may calculate a mean μ and the standard deviation σ of the intensities within the block BC (Block 1406).

The BMI collection device 120 may initialize a block pixel counter (BPC) for all the pixels within block BC to zero (Block 1408). A linear pixel count is presented merely for simplicity, and should not be seen as dispositive. The BMI collection device 120 may compare the intensity of pixel BPC to the statistics of the intensities within block BC (Block 1410). If the intensity of pixel BPC is not greater than the mean intensity μ of the block BC plus a scalar factor K of the standard deviation σ for block BC (Block 1412), the BMI collection device 120 may set the intensity for the pixel BPC to 0.0 (Block 1414). If the intensity of pixel BPC is greater than the mean intensity μ of the block BC plus a scalar factor K of the standard deviation σ for block BC (Block 1412), the BMI collection device 120 may set the intensity for the pixel BPC to 1.0 (Block 1416).

The BMI collection device 120 may move to the next pixel by incrementing the BPC (Block 1418). If the BPC has not reached the final pixel in the current block ($BP_{MAX}$) (Block 1420), BMI collection device 120 may compare the intensity of pixel BPC to the statistics of the intensities within block BC (Block 1410). If the BPC has reached the final pixel $BP_{MAX}$ (Block 1420), the BMI collection device 120 may move to the next block by incrementing the BC (Block 1422). If the BC has not reached the final block $B_{MAX}$ (Block 1424), the BMI collection device 120 may calculate a mean μ and the standard deviation σ of the intensities within the block BC (Block 1406).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method, comprising:
    determining that a digital image contains a biometric identifier;
    dividing the digital image into a grid of blocks;
    computing a ridge orientation for each block containing a portion of the biometric identifier in the grid of blocks;
    determining a bad block in the grid of blocks by applying a bad block heuristic, the bad block heuristic comparing the computed ridge orientation for each block containing the portion of the biometric identifier in the grid of blocks as a target block to the ridge orientation for each block directly adjacent to the target block and identifying the target block as a bad block if a deviation between the ridge orientation of the target block and ridge orientations of the directly adjacent blocks exceeds a certain threshold;
    executing lighting compensation to remove a lighting effect from the biometric identifier, the lighting compensation being a piece-wise linear transformation of a light intensity for each block of the digital image that calculates an intensity height field of the each block in the grid of blocks and fits a separate plane to the calculated intensity height field for the each block;
    processing the biometric identifier ignoring the identified bad blocks and after the lighting compensation is executed to create an identification profile; and
    outputting the created identification profile in a format usable by a user.

2. The method of claim 1, wherein the biometric identifier is a fingerprint.

3. The method of claim 1, further comprising:
    isolating the biometric identifier in the digital based on an analysis of the each block in the grid of blocks.

4. The method of claim 1, further comprising:
    applying a first iteration of a Gabor filter to the digital image.

5. The method of claim 4, further comprising:
    automatically computing a Gabor parameter controlling wavelength for use by the Gabor filter.

6. The method of claim 4, further comprising:
    applying multiple iterations of the Gabor filter to the digital image.

7. The method of claim 1, the ridge orientation being computed by applying the following equations:

$$\Delta x = \sum_{i=1}^{W} \sum_{j=1}^{W} 2G_x(i, j)G_y(i, j),$$

$$\Delta y = \sum_{i=1}^{W} \sum_{j=1}^{W} (G_x^2(i, j) - G_y^2(i, j)),$$

$$\theta = \frac{1}{2}\tan^{-1}\left(\frac{\Delta x}{\Delta y}\right),$$

where $G_x$ and $G_y$ are horizontal (X) and vertical (Y) gradients respectively in block (i,j), W is a size of each block (i,j) along each axis, and $\theta$ is the computed ridge orientation for the each block (i,j).

8. The method of claim 7, the bad block heuristic identifying the target block as the bad block by applying the following equation:

$$V > \frac{1}{|N|}\sqrt{\sum_{(i,j) \in N} |\theta(i, j) - \theta(u, v)|^2}$$

where N is a set of the directly adjacent blocks to the target block at location (u,v) and V is the certain threshold.

9. A biometric identifier collection device, comprising:
    a memory that stores a digital image having a biometric identifier;
    a processor that is programmed to:
        divide the digital image into a grid of blocks,
        compute a ridge orientation for each block containing a portion of the biometric identifier in the grid of blocks, determine a bad block in the grid of blocks by applying a bad block heuristic, the bad block heuristic comparing the computed ridge orientation for each block containing the portion of the biometric identifier in the grid of blocks as a target block to the ridge orientation for each block directly adjacent to the target block and identifying the target block as a bad block if a deviation between the ridge orientation of the target block and ridge orientations of the directly adjacent blocks exceeds a certain threshold, execute a lighting compensation to remove a lighting effect from the biometric identifier, the lighting compensation being a piece-wise linear transformation of a light intensity for each block of the digital image that calculates an intensity height field of the each block in the grid of blocks and fits a separate plane to the calculated intensity height field for the each block, and process the biometric identifier ignoring the identified bad blocks and after the lighting compensation is executed to create an identification profile; and an output device that outputs the created identification profile in a format usable by a user.

10. The biometric identifier collection device of claim 9, further comprising:

a digital camera component that generates the digital image.

11. The biometric identifier collection device of claim 9, the processor being further programmed to automatically compute a Gabor parameter controlling wavelength and to apply multiple iterations of a Gabor filter to the digital image.

12. The biometric identifier collection device of claim 9, the ridge orientation being computed by applying the following equations:

$$\Delta x = \sum_{i=1}^{W} \sum_{j=1}^{W} 2G_x(i, j)G_y(i, j),$$

$$\Delta y = \sum_{i=1}^{W} \sum_{j=1}^{W} (G_x^2(i, j) - G_y^2(i, j)),$$

$$\theta = \frac{1}{2}\tan^{-1}\left(\frac{\Delta x}{\Delta y}\right),$$

where $G_x$ and $G_y$ are horizontal (X) and vertical (Y) gradients respectively in block (i,j), W is a size of each block (i,j) along each axis, and $\theta$ is the computed ridge orientation for the each block (i,j).

13. The biometric identifier collection device of claim 12, the bad block heuristic identifying the target block as the bad block by applying the following equation:

$$V > \frac{1}{|N|}\sqrt{\sum_{(i,j)\in N} |\theta(i, j) - \theta(u, v)|^2}$$

where N is a set of the directly adjacent blocks to the target block at location (u,v) and V is the certain threshold.

14. A non-transitory storage medium on which is recorded a set of instructions executable by a processor to implement a method for processing digital images, the method comprising:

determining that a digital image contains a biometric identifier;

dividing the digital image into a grid of blocks;

computing a ridge orientation for each block containing a portion of the biometric identifier in the grid of blocks;

determining a bad block in the grid of blocks by applying a bad block heuristic, the bad block heuristic comparing the computed ridge orientation for each block containing the portion of the biometric identifier in the grid of blocks as a target block to the ridge orientation for each block directly adjacent to the target block and identifying the target block as a bad block if a deviation between the ridge orientation of the target block and ridge orientations of the directly adjacent blocks exceeds a certain threshold;

executing lighting compensation to remove a lighting effect from the biometric identifier, the lighting compensation being a piece-wise linear transformation of a light intensity for each block of the digital image that calculates an intensity height field of the each block in the grid of blocks and fits a separate plane to the calculated intensity height field for the each block; and processing the biometric identifier ignoring the identified bad blocks and after the lighting compensation is executed to create an identification profile; and outputting the created identification profile in a format usable by a user.

15. The non-transitory storage medium of claim 14, the method further comprising:

automatically computing a Gabor parameter controlling wavelength; and applying multiple iterations of a Gabor filter to the digital image.

16. The non-transitory storage medium of claim 14, the ridge orientation being computed by applying the following equations:

$$\Delta x = \sum_{i=1}^{W} \sum_{j=1}^{W} 2G_x(i, j)G_y(i, j),$$

$$\Delta y = \sum_{i=1}^{W} \sum_{j=1}^{W} (G_x^2(i, j) - G_y^2(i, j)),$$

$$\theta = \frac{1}{2}\tan^{-1}\left(\frac{\Delta x}{\Delta y}\right),$$

where $G_x$ and $G_y$ are horizontal (X) and vertical (Y) gradients respectively in block (i,j), W is a size of each block (i,j) along each axis, and $\theta$ is the computed ridge orientation for the each block (i,j).

17. The non-transitory storage medium of claim 16, the bad block heuristic identifying the target block as the bad block by applying the following equation:

$$V > \frac{1}{|N|}\sqrt{\sum_{(i,j)\in N} |\theta(i, j) - \theta(u, v)|^2}$$

where N is a set of the directly adjacent blocks to the target block at location (u,v) and V is the certain threshold.

* * * * *